(12) United States Patent
Newkirk

(10) Patent No.: US 6,768,584 B2
(45) Date of Patent: Jul. 27, 2004

(54) DEVICES ADAPTED TO BE HELD AT EYE LEVEL BY APPARATUS

(76) Inventor: Darrel Newkirk, 2737 N. 102 St., Kansas City, KS (US) 66190

( * ) Notice: Subject to any disclaimer, the term of this patent is extended or adjusted under 35 U.S.C. 154(b) by 0 days.

(21) Appl. No.: 10/171,564

(22) Filed: Jun. 12, 2002

(65) Prior Publication Data
US 2003/0231387 A1 Dec. 18, 2003

(51) Int. Cl.$^7$ .............................................. G02B 23/00
(52) U.S. Cl. ....................... 359/409; 359/406; 359/477; 359/811; 345/8
(58) Field of Search ................................ 359/409, 477, 359/632, 630, 362–363, 375–378, 381–385, 399, 800, 404–408, 429–430, 478–482, 803–804, 808–812, 815–816; 345/8, 7, 9; 351/41, 158; 2/10–13, 410, 422, 426; 248/42, 48, 53

(56) References Cited

U.S. PATENT DOCUMENTS 5,251,333 A * 10/1993 Tsook .............................. 2/6.2
5,486,841 A * 1/1996 Hara et al. ...................... 345/8
6,115,846 A * 9/2000 Truesdale .................. 2/209.13
6,332,685 B2 * 12/2001 Seifert ......................... 359/600
6,392,798 B1 * 5/2002 Newkirk ..................... 359/409

* cited by examiner

Primary Examiner—Audrey Chang
Assistant Examiner—Denise S. Allen
(74) Attorney, Agent, or Firm—Hovey Williams LLP

(57) ABSTRACT

A viewing device (10) adapted to be held at eye level by an apparatus (14) comprises a housing (16) designed to fit within a tray (12) of the apparatus (14), two eyepieces (22) mounted to a proximal end (24) of the housing, a magnification mechanism (26), and a focus mechanism (28). The device (10) also includes either two objective lenses (18) or a video screen (118) mounted to a distal end (20) of the housing (16). The housing (16) preferably includes a substantially flat bottom (30) and two substantially flat sides (32) and is preferably secured to the tray (12) by a threaded fastener (36). The eyepieces (22) are preferably flexible and padded to provide a comfortable fit. The eyepieces (22) may be either contoured or substantially flat. The contoured eyepieces (22) fit against a user's face. The substantially flat eyepieces (22) fit against the user's eyeglasses.

4 Claims, 3 Drawing Sheets

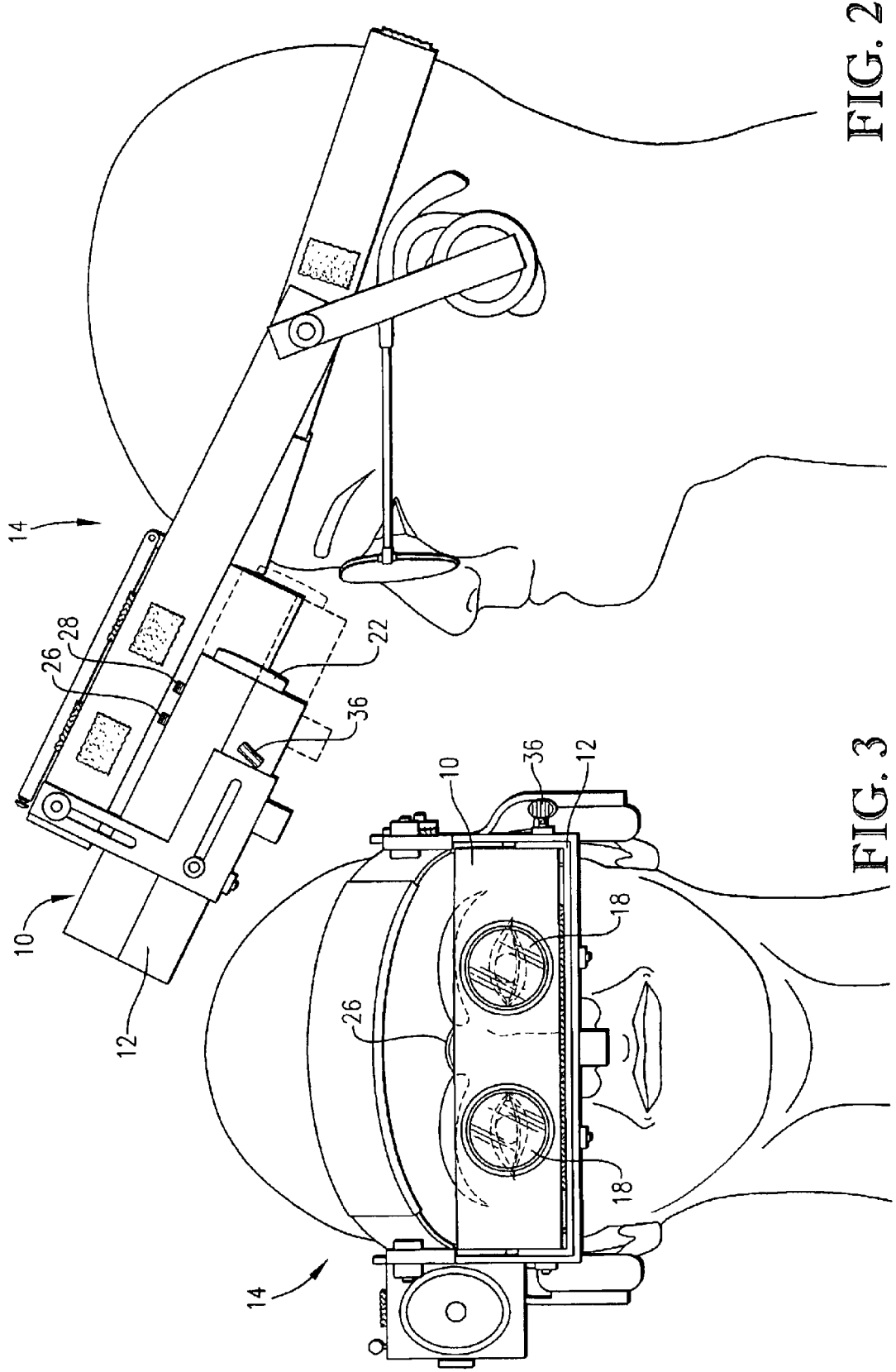

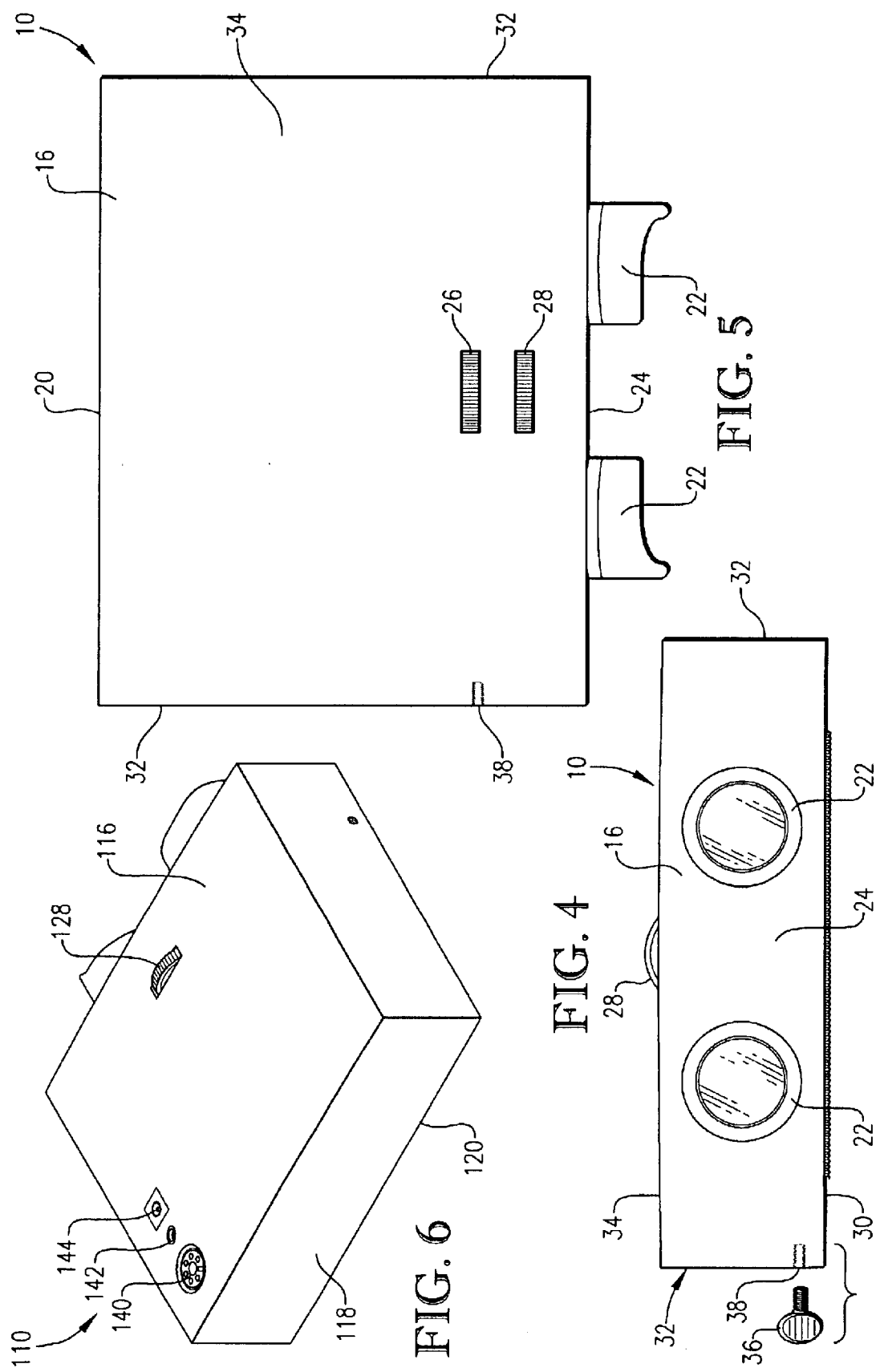

DEVICES ADAPTED TO BE HELD AT EYE LEVEL BY APPARATUS

BACKGROUND OF THE INVENTION

1. Field of the Invention

The present invention relates to viewing devices. More particularly, the present invention relates to viewing devices adapted to be held at eye level by an apparatus.

2. Description of Prior Art

Persons attending sporting events or concerts often make use of binoculars to assist in their viewing of the event or concert. Binoculars are most often simply hung about the user's neck and shoulders using a conventional strap. This means that each time binocular-assisted viewing is desired, the binoculars must be manually grasped, moved to eye level, and held in place.

In many cases, the effort required to use binoculars or cameras quickly leads to frustration and non-use. Rather than go through all of the steps required for binocular use, event attendees often decide that it is more enjoyable to forego their use altogether.

Television broadcasts of sporting events and scoreboard mounted screens typically include features, such as instant replay and player statistics. To enjoy such features people must either carry a television set to the event or constantly look away from the event and at the scoreboard. This only exasperates the problems described above.

Recently, an apparatus has been developed to hold viewing devices, such as binoculars and video screens at or near eye level, even when the devices are not in use. However, currently available viewing devices do not properly fit into the apparatus, and therefore cannot be effectively supported by the apparatus.

Accordingly, there is a need for improved viewing devices that overcome the limitations of the prior art.

SUMMARY OF THE INVENTION

The present invention overcomes the above-identified problems and provides a distinct advance in the art of viewing devices. More particularly, the present invention provides viewing devices adapted to be held at eye level by an apparatus having a tray that can be positioned below a user's eyes. A first embodiment of the device broadly comprises a housing designed to fit within the tray of the apparatus, two objective lenses mounted to a distal end of the housing, two eyepieces mounted to a proximal end of the housing, a manual magnification mechanism operable through the housing, and a manual focus mechanism operable through the housing. The housing seats within the tray preferably has a substantially flat bottom and two substantially flat sides.

The housing is preferably secured to the tray by a threaded fastener, such as a bolt or a screw. The fastener is driven through the tray into a threaded hole in the housing. The fastener and the hole may be any size, but the fastener is preferably either a wing-type or a knob-type allowing the user to attach and detach the device without tools.

The objective lenses are preferably coated with an anti-fog material as is typically done with commonly available binoculars and rifle scopes. The objective lenses are preferably sealed within the distal end of the housing such that water is prevented from entering the housing. The objective lenses are preferably approximately one and three quarter inches in diameter, but may be as small as one inch in diameter.

The eyepieces are preferably flexible and padded to provide a comfortable fit. The eyepieces may be either contoured or substantially flat. The contoured eyepieces are designed to fit against the user's face and preferably completely surround each of the user's eyes in order to block out stray light. Therefore, the contoured eyepieces may extend rearwardly of the proximal end of the housing by as much as two inches. The substantially flat eyepieces are designed to fit against the user's eyeglasses, and therefore preferably do not extend beyond the housing more than one half inch.

The magnification mechanism and the focus mechanism preferably operate like those typically found on commonly available binoculars and allow the user to adjust magnification and focus of objects seen through the device. The magnification mechanism and the focus mechanism preferably extend through and are preferably sealed to a top surface of the housing such that water is prevented from entering the housing.

In use, the user secures the device within the tray using the fastener. The user then puts the apparatus on his or her head and adjusts the apparatus to get a comfortable fit. The user may use the device by lowering the tray so that the device is at eye level, as shown in FIG. 1. Alternatively, the user may discontinue use of the device by raising the tray so that the device is above eye level, as shown in FIG. 2.

A second embodiment of the device is similar to the first embodiment, except that the two objective lenses are replaced by a video screen. The screen is preferably operable to display a color image so that a user wearing the apparatus may view the image. The screen may accept digital or analog signals representative of the image through a video signal connector. As such, the screen may act as a monitor for and accept signals from a computer or video game. The screen may also accept signals from external tuners, video cassette recorders (VCRs), and digital video disc (DVD) players.

Additionally, a magnification mechanism of the second embodiment of the device is preferably fixed such that the image is magnified at approximately eight power magnification. The device may include an integral power source, such as a battery. Alternatively, the device may include a power connector through which the device receives power from the apparatus or another source.

In use, the user secures the device of the second embodiment within the tray using the fastener. The user then puts the apparatus on his or her head and adjusts the apparatus to get a comfortable fit. The user may also be required to connect a cable to the video signal connector and/or the power connector in order to use the device. The user may use the device by lowering the tray so that the device is at eye level. Alternatively, the user may discontinue use of the device by raising the tray so that the device is above eye level.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein:

FIG. 2 is another side elevation view of the device of FIG. 1 being held above eye level by the apparatus;

FIG. 3 is a front elevation view of the device of FIG. 1 being held at eye level by the apparatus;

FIG. 4 is a rear elevation view of the device of FIG. 1;

FIG. 5 is a plan view of the device with contoured eyepieces; and

FIG. 6 is a perspective view of a viewing device constructed in accordance with a second embodiment of the present invention.

DETAILED DESCRIPTION OF A PREFERRED EMBODIMENT

Figure 1:
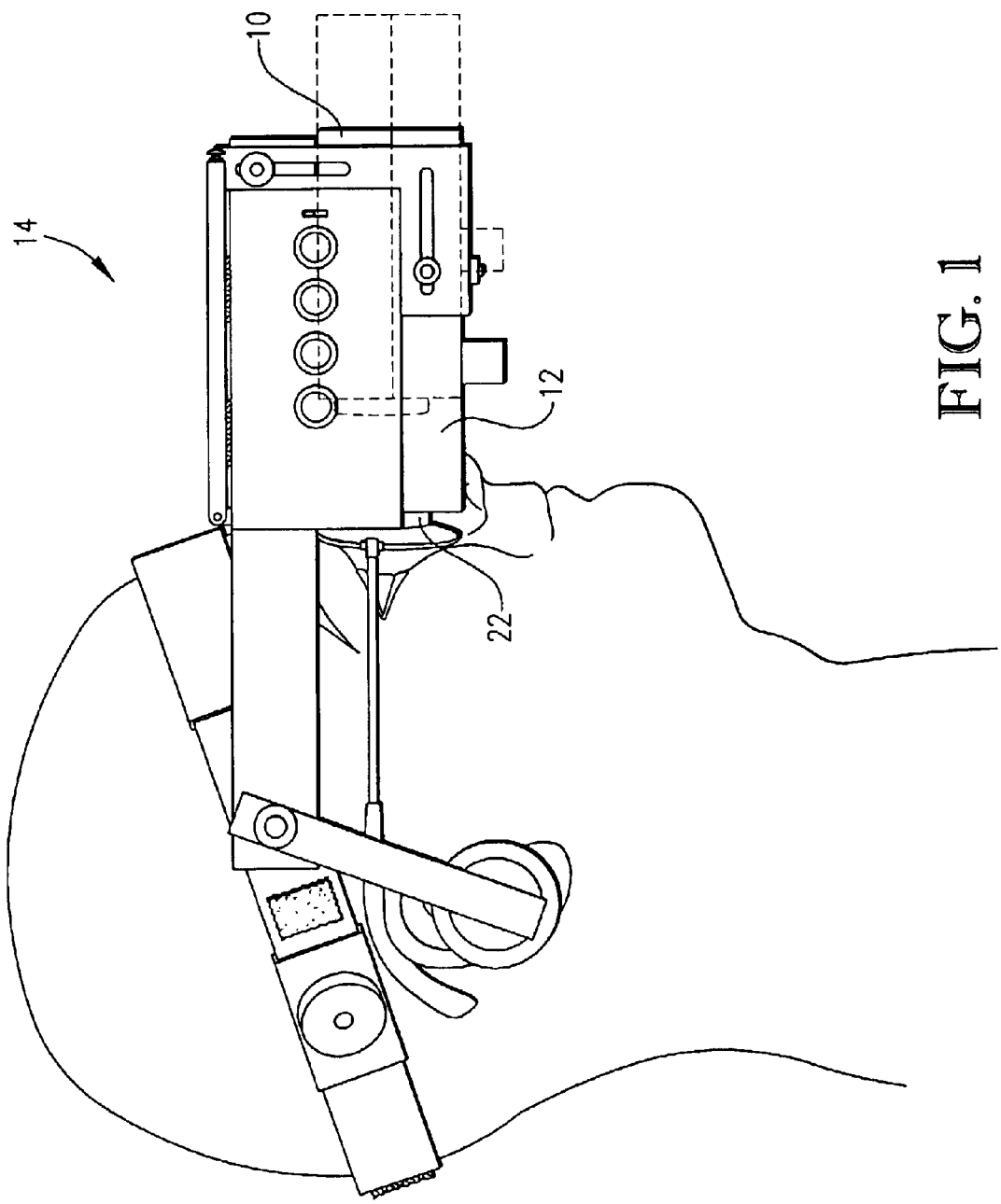
FIG. 1 is a side elevation view of a viewing device with substantially flat eyepieces constructed in accordance with a first embodiment of the present invention being held at eye level by an apparatus.

Referring to FIG. 1, a viewing device 10 constructed in accordance with a first embodiment of the present invention is illustrated resting in a tray 12 of an apparatus 14 such as that illustrated in U.S. Pat. No. 6,392,798 incorporated herein by reference. The apparatus 14 is designed to hold the device 10 at eye level when a user wishes to use the device 10. Additionally, as shown in FIG. 2, the apparatus 14 is designed to hold the device 10 above eye level when the user wishes to not use the device 10.

The tray 12 preferably slides within the apparatus 14 allowing the user to move the device 10 closer to or away from his or her face. Additionally, the tray 12 preferably may be adjusted up and down in order to hold the device 10 at eye level for different users. The tray 12 is preferably approximately six and one half inches wide, approximately four and one half inches deep, and approximately one inch tall.

Referring also to FIGS. 3-5, the device 10 broadly comprises a housing 16 designed to fit within the tray 12, two objective lenses 18 mounted to a distal end 20 of the housing 16, two eyepieces 22 mounted to a proximal end 24 of the housing 16, a manual magnification mechanism 26 operable through the housing 16, and a manual focus mechanism 28 operable through the housing 16. The device 10 is designed to be lightweight in order to not overload the tray 12 and insure that the apparatus 14 is comfortable to wear. Therefore, the device 10 preferably weighs between one half pound and one pound, but may weigh up to two pounds.

The housing 16 is preferably approximately six and one half inches wide, approximately four and one half inches deep, and approximately two inches tall. The housing 16 preferably has a substantially flat bottom 30 and two substantially flat sides 32. As shown, the housing 16 seats within the tray 12; however, the housing 16 may extend above, forward, and/or rearward of the tray 12. The distal end 20, the proximal end 24, and a top surface 34 may be substantially flat or contoured, since they do not contact the tray 12.

The housing 16 is preferably secured to the tray 12 by a threaded fastener 36, such as a bolt or a screw. The fastener 36 may be driven through the tray 12 into a threaded hole 38 in the housing 16. The fastener 36 and the hole 38 may be any size, but the fastener 36 is preferably either a wing-type or a knob-type allowing the user to attach and detach the device 10 without tools. While using the fastener 36 and the hole 38 is the preferred method of securing the device 10 to the tray 12, other methods may be used, such as using velcro or straps.

The objective lenses 18 are preferably coated with an anti-fog material as is typically done with commonly available binoculars and rifle scopes. The objective lenses 18 are preferably sealed within the distal end 20 of the housing 16 such that water is prevented from entering the housing 16. The objective lenses 18 are preferably approximately one and three quarter inched in diameter, but may be as small as one inch in diameter.

The eyepieces 22 are preferably flexible and padded to provide a comfortable fit. The eyepieces 22 may be either contoured or substantially flat. The contoured eyepieces 22 are designed to fit against the user's face and preferably completely surround each of the user's eyes in order to block out stray light. Therefore, the contoured eyepieces 22 may extend rearwardly of the proximal end 24 of the housing 16 by as much as two inches. The substantially flat eyepieces 22 are designed to fit against the user's eyeglasses, and therefore preferably do not extend beyond the housing 16 more than one half inch.

The magnification mechanism 26 preferably operates like those typically found on commonly available binoculars and is preferably a magnification wheel that allows the user to adjust magnification of objects seen through the device 10. The magnification mechanism 26 preferably extends through and is preferably sealed to the top surface 34 of the housing 16 such that water is prevented from entering the housing 16.

With the magnification mechanism 26, the device 10 may be used as long range binoculars, such as for use at sporting events, concerts, performances, other events. Additionally, the magnification mechanism 26 allows the device 10 to be used while hunting and/or birdwatching. In this case, the magnification mechanism 26 may adjust magnification of the objects between eight power magnification and twenty power magnification.

Alternatively, the device 10 may be used as a short range magnifier, such as for use when reading, sewing, woodworking, and other hobbies. In this case, the magnification mechanism 26 may adjust magnification of the objects between two power magnification and eight power magnification.

The focus mechanism 28 preferably operates like those typically found on commonly available binoculars and is preferably a focus wheel that allows the user to adjust focus of the objects. The focus mechanism 28 preferably extends through and is preferably sealed to the top surface 34 of the housing 16 such that water is prevented from entering the housing 16.

In use, the user secures the device 10 within the tray 12 using the fastener 36. The user then puts the apparatus 14 on his or her head and adjusts the apparatus 14 to get a comfortable fit. The user may use the device 10 by lowering the tray 12 so that the device 10 is at eye level, as shown in FIG. 1. Alternatively, the user may discontinue use of the device 10 by raising the tray 12 so that the device 10 is above eye level, as shown in FIG. 2.

Referring to FIG. 6, a viewing device 110 constructed in accordance with a second embodiment of the present invention is similar to the device 10 of the first embodiment. One significant difference is that the two objective lenses 18 are replaced by a video screen 118. The screen 118 is mounted to a distal end 120 of a housing 116 and is preferably operable to display a color image so that a user wearing the apparatus 14 may view the image. The screen 118 is preferably a color LCD screen approximately six and one half inches wide and approximately two inches tall. The screen 118 may be mounted within the housing 116 or may form the distal end 120 of the housing 116.

The screen 118 may accept digital or analog signals representative of the image through a video signal connector 140. As such, the screen 118 may act as a monitor for and accept signals from a computer or video game. The screen 118 may also accept signals from external tuners, video cassette recorders (VCRs), and digital video disc (DVD) players.

Alternatively, the device 110 may receive signals representative of the image through an antenna. In this case, the device 110 may include signal reception circuitry to allow the device 110 to tune-in a television broadcast or other signal. The device 110 may also include an audio output connector 142 allowing the device 110 to supply audio signals to the apparatus 14, a pair of headphones, or another speaker arrangement.

Therefore, the screen 118 may be used to watch live television broadcasts, closed circuit broadcasts, and/or recorded video programs. Additionally, the screen 118 may be used as a monitor for a computer and/or to play video games.

A magnification mechanism of the device 110 is preferably fixed such that the image is magnified at approximately eight power magnification. The device 110 may include an integral power source, such as a battery. Alternatively, the device 110 may include a power connector 144 through which the device 110 receives power from the apparatus 14 or another source.

A manual focus mechanism 128 is preferably operable through the housing 116. The focus mechanism 128 preferably operates like those typically found on commonly available binoculars and is preferably a focus wheel that allows the user to adjust focus of the objects. The focus mechanism 128 preferably extends through and is preferably sealed to the housing 116 such that water is prevented from entering the housing 116.

In use, the user secures the device 110 within the tray 12 using the fastener 36. The user then puts the apparatus 14 on his or her head and adjusts the apparatus 14 to get a comfortable fit. The user may also be required to connect a cable to the video signal connector 140, the audio output connector 142, and/or the power connector 144 in order to use the device 110. The user may use the device 110 by lowering the tray 12 so that the device 110 is at eye level. Alternatively, the user may discontinue use of the device 110 by raising the tray 12 so that the device 110 is above eye level.

While the present invention has been described above, it is understood that other dimensions can be substituted. Additionally, other magnification powers can be used. Furthermore, the magnification mechanism 26 and/or the focus mechanism 28, 128 may be operable through the bottom 30 of the housing 16. These and other minor modifications are within the scope of the present invention.

It can be seen that the user may use either the device 10 or the device 110 with the apparatus 14. Additionally, it can be seen that the user may quickly and easily change between using the device 10 and the device 110 without the use of tools. It is anticipated that this feature may prove beneficial in many circumstances, such as when watching a sporting event.

Having thus described a preferred embodiment of the invention, what is claimed as new and desired to be protected by Letters Patent includes the following:

What is claimed is:

1. An assembly comprising:
a viewing device adapted to be held at eye level, the device including
a housing
a removable attachment mechanism operable to be coupled with the housing,
two objective lenses each mounted to a distal end of the housing, and
two eyepieces each mounted to a proximal end of the housing; and
an apparatus of holding the device at eye level of a user, the apparatus including
a pair of elongated arms each having a first and a second end,
an attachment for mounting the first ends on opposite sides of the user's head with the arms extending forwardly and the second ends spaced from the user's head,
an adjustment bracket extending between and secured adjacent the second ends,
a tray supported upon the bracket forwardly of the user's head, the tray being adapted to hold the device from below, and
wherein the arms are swingable between a use position where the device is at the user's eye level and a crosspiece of the tray is below the user's eye level, and an elevated position where the device is moved out of the user's field of vision.

2. An assembly comprising:
a binocular adapted to be held at eye level, the binocular including
a housing
a removable attachment mechanism operable to be coupled with the housing,
two objective lenses each mounted to a distal end of the housing, and two eyepieces each mounted to a proximal end of the housing; and
an apparatus for holding the binocular at the eye level of a user including
a pair of elongated arms each having a first and a second end,
an attachment for mounting the first ends on opposite sides of the user's head with the arms extending forwardly and the second ends spaced from the user's head,
an adjustment bracket extending between and secured adjacent the second ends,
a tray supported upon the bracket forwardly of the user's head, the tray having a nose-receiving recess in a rearward surface and adapted to hold the binocular from below, and
wherein the arms are swingable between a use position where the binocular is at the user's eye level and a crosspiece of the tray is below the user's eye level, and an elevated position where the binocular is moved out of the user's field of vision.

3. An assembly comprising:
a viewing device adapted to be held at eye level, the device including
a housing,
a removable attachment mechanism operable to be coupled with the housing,
a video screen mounted to a distal end of the housing and operable to display an image,
two eyepieces each mounted to a proximal end of the housing, and a manual focus mechanism operable through the housing; and
an apparatus for holding the device at eye level of a user, the apparatus including
a pair of elongated arms each having a first and a second end,
an attachment for mounting the first ends on opposite sides of the user's head with the arms extending forwardly and the second end spaced from the user's head,
an adjustment bracket extending between and secured adjacent the second ends, a tray supported upon the bracket forwardly of the user's head, the tray being adapted to hold the device from below, and wherein the arms are swingable between a use position where the device is at the user's eye level and a crosspiece of the tray is below the user's eye level, and an elevated position where the device is moved out of the user's field of vision.

4. An assembly comprising:

a viewing device adapted to be held at eye level, the device including a housing with at least three substantially flat sides, a fastener hole in one of the sides operable to accept a fastener, a video screen mounted to a distal end of the housing and operable to display a color image, a video connector mounted to the housing and operable to accept signals representative of the image, two padded eyepieces each mounted to a proximal end of the housing, and a manual focus mechanism operable through the housing; and an apparatus for holding the device at eye level of a user, the apparatus including a pair of elongated arms each having a first and a second end, an attachment for mounting the first ends on opposite sides of the user's head with the arms extending forwardly and the second ends spaced from the user's head, an adjustment bracket extending between and secured adjacent the second ends, a tray supported upon the bracket forwardly of the user's head, the tray having a nose-receiving recess in a rearward surface and adapted to hold the device from below, and wherein the arms are swingable between a use position where the device is at the user's eye level and a crosspiece of the tray is below the user's eye level, and an elevated position where the device is moved out of the user's field of vision.

* * * * *